UNITED STATES PATENT OFFICE.

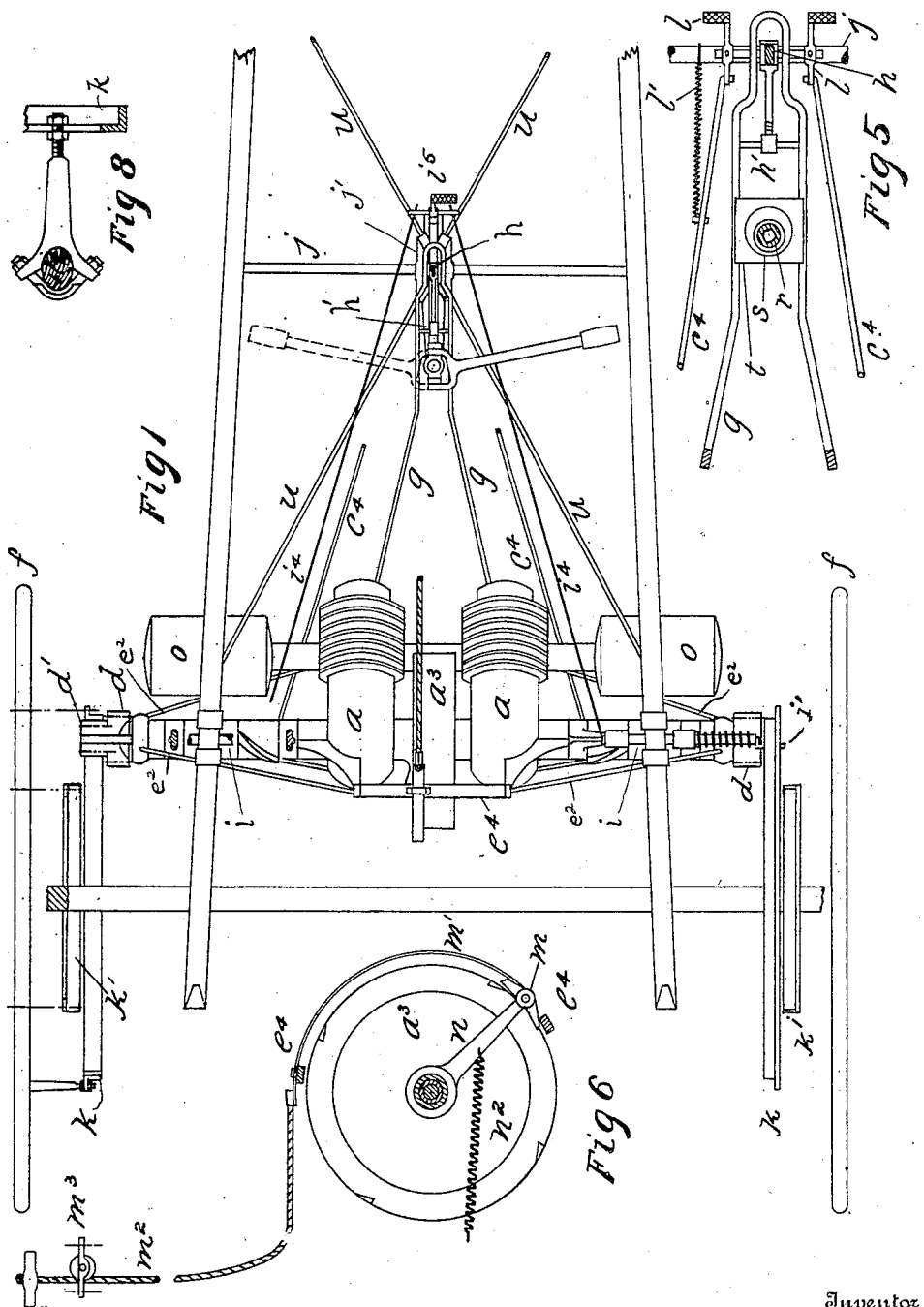

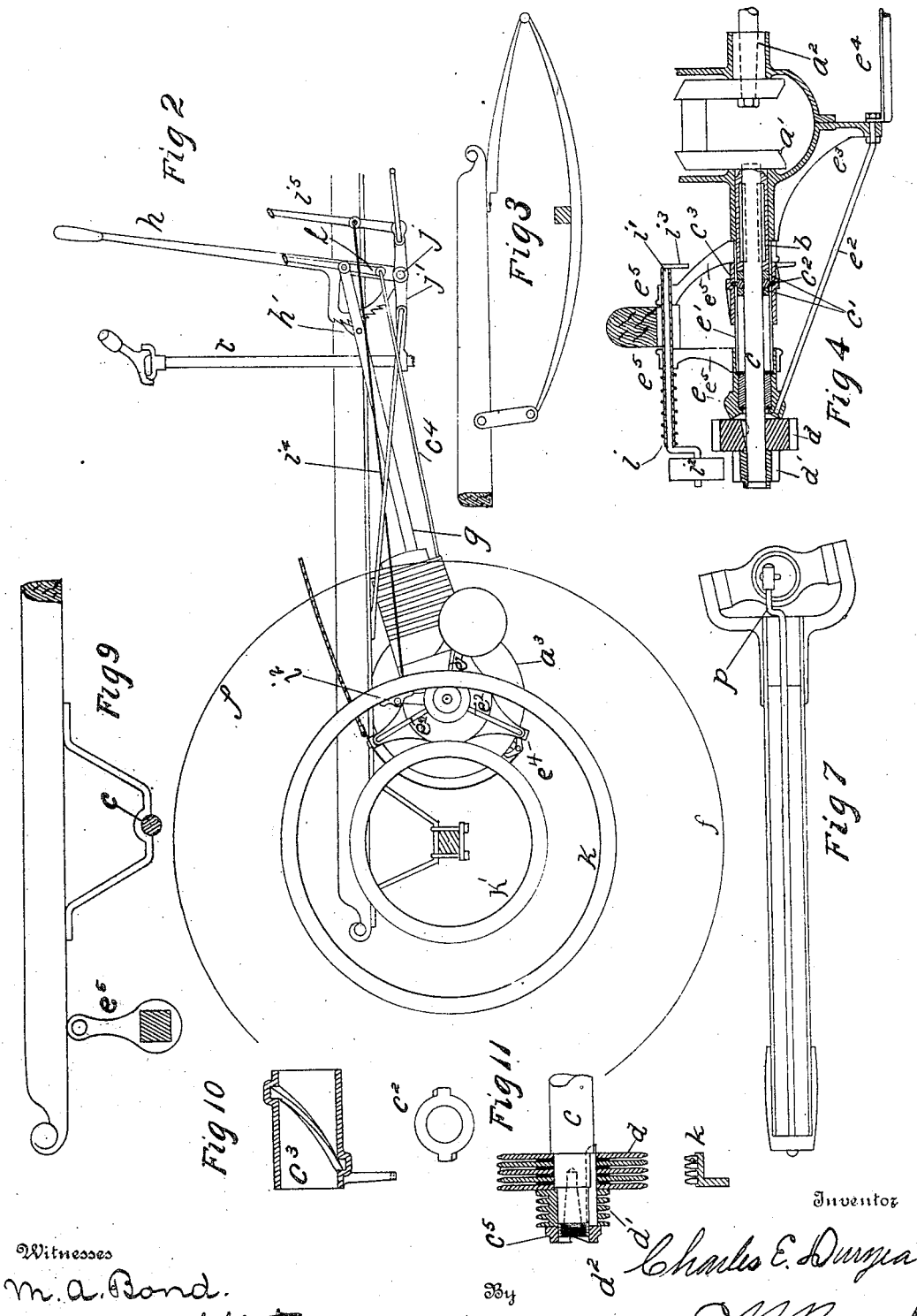

CHARLES E. DURYEA, OF READING, PENNSYLVANIA.

MOTOR-VEHICLE.

1,034,769.  Specification of Letters Patent.  Patented Aug. 6, 1912.

Application filed September 17, 1908. Serial No. 453,501.

*To all whom it may concern:*

Be it known that I, CHARLES E. DURYEA, a citizen of the United States of America, and resident of the city of Reading, in the county of Berks and State of Pennsylvania, have invented certain new and useful Improvements in Motor-Vehicles, of which the following is a specification.

My invention relates to the class of motor vehicles having the shaft of the motor parallel to the vehicle axles and more particularly to means for transmitting the power of the motor to the driving wheels.

The objects of the invention are to provide a simple and cheap mechanism, one that may be easily operated and cared for and one adapted to the use of parts commonly used in horse vehicle construction with other objects as will appear in the following specification.

I accomplish the objects desired by the mechanism shown in the accompanying drawings in which—

Figure 1 is a plan of part of the most common form of vehicle chassis; Fig. 2 is an elevation of the same part of the chassis; Fig. 3 is an elevation of the forward part of the chassis which is broken away in Figs. 1 and 2 to secure greater size of drawing of the various parts; Fig. 4 is an elevation of a vertical cross section through the motor shaft; Fig. 5 is an enlarged plan of some of the parts at the front of the plan Fig. 1; Fig. 6 is a detail of a starting device usable from the seat of the vehicle; Fig. 7 is a detail plan showing the relation of the steering lever to the post; Fig. 8 is a detail of the ring support; Fig. 9 is an elevation of an alternative method of securing the necessary relations between the motor shaft and vehicle axle; Fig. 10 is two details of the means for shifting the driving rollers and Fig. 11 shows two other details of the driving rollers and driven ring.

Similar letters refer to similar parts.

My device consists briefly in a chassis or frame of a vehicle, a mechanism capable of developing power thereon, means for varying the relation of the chassis and power plant to each other and suitable driving rollers and rings, sometimes called friction gears; together with the necessary minor mechanism for securing the harmonious operation of the parts.

While any type of motor is applicable I have shown and prefer the internal combustion motor commonly known as the 2-cycle type, having two working cylinders with fly-wheel between them. For greater clearness I have not shown the carbureter nor the sparking apparatus since these are well known and not essential to an understanding of my device. Likewise some other parts have been omitted wholly or have been but outlined. I fit the motors $a$ $a$ and the fly-wheel $a^3$ together by means of the tapered shaft ends shown at $a^2$ in Fig. 4 and I provide the outer ends of the motor shafts (see $a'$ Fig. 4) with suitable means for telescoping extensions $c$ of the motor shaft. As shown these devices may consist of deep borings in the shaft ends in which feathers are fitted, on which may telescope the grooved inner end of the extension $c$. On the outer end of the extension $c$ is fastened a large roller $d$, and a small roller $d'$. (See Figs. 1, 2, 4, and 11.) This outer end of the extension runs in a roller bearing in the cap $e$ of a truss formed by a tube $e'$, three truss rods $e^2$, brackets $e^3$ from the engine case and bridges $e^4$ connecting the two cases. By this trussed arrangement of the main parts of the power plant, the engine shafts and their extensions are amply able to resist any tendency toward deflection from a straight line due to road shocks or to the necessary pull to insure the proper contact for driving the vehicle wheels $f$ $f$ as will be hereafter described. From the engine cases there extends forward a subframe $g$ to a controlling lever $h$ near the front of the chassis. Surrounding the truss tube $e'$ are the lower eyes of the links $e^5$ $e^5$ Fig. 4 which at their upper eyes surround the pivot tube $i$ and form means for supporting the weight of the power plant largely while leaving same free to be swung fore and aft. The pivot tubes $i$ $i$ are clamped to the side bars of the chassis by caps and clips in a self-evident manner and form two points of support for the power plant while the subframe $g$ completes a triangular structure and is supported at its forward end on the shifting lever $h$ which is carried on the chassis by the cross bar $j$.

This arrangement not only forms a three point support for the power plant, which form is least affected by the inequalities of the road, but it allows the operator to throw the motor shaft rollers into engagement with the large rings $k$ on the driving wheels $f$ or back into engagement with the smaller reverse rings $k'$, or into neutral position. A pawl and ratchet $h'$ are used to hold the forward driving contact but because the reverse is but a temporary affair it is customarily held in contact by the operator although a second pawl and ratchet operative in a reverse direction or some similar means can easily be supplied. The pawls of course are provided with the usual means for releasing them which I have not shown.

In Fig. 1 the driving rollers $d$ $d'$ are shown in the slow speed forward position with $d'$ in position to contact with large ring $k$ and against the inner surfaces thereof. In this position the pedals $l$ $l$ are in the position shown in Fig. 5, that is to say forward at the top. These pedals are fixed to the pivot so that the movement of one moves the pivot and the other pedal with its rod and thus the operator may, by pushing on either pedal, contract both extension shafts at the same movement and by swinging the plant forward he may engage the smaller rollers with the inner surfaces of the larger rings and thus get slow speed forward; while by releasing the pawl and bringing the plant back to neutral position the spring $l'$ will extend the rollers and the extension shafts into the normal or high speed position with the large roller in line with the large ring and the small roller in line with the small ring. In this position the direction of the vehicle can be changed from high speed forward to reverse by simply swinging the power plant from front to rear.

It is self-evident that the power plant could be as readily fixed on the chassis and the rear axle shifted fore and aft to get the engagement with the driving devices and this arrangement is indicated in Fig. 9 where $c$ indicates the motor shaft extension and $e^5$ the link which permits the axle to swing.

The pivot $i$ Fig. 4 is hollow and in it is mounted the brake crank $i'$ with its grooved shoe $i^2$ and a suitable spring for retracting the shoe. From the end of the lever $i^3$ a wire or cable $i^4$ leads forward to a pedal lever $i^5$ reachable by the foot of the operator in a self-evident manner. It will be seen in Fig. 2 that the brake shoe $i^2$ bears against the grooved surface of the ring $k$ and this not only makes a very effective brake but it performs an efficient service in that using the brake causes the shoe $i^2$ to smooth the driving surfaces of the ring $k$ and thus keeps it in good order for the rollers $d$ or $d'$ to run against and particularly reduces the noise that would result from metal rollers running against an uneven or roughened surface.

The driving rollers are telescoped or shifted laterally by providing the extension shafts $c$ with two collars each $c'$ between which collars is a ring $c^2$ with oppositely projecting studs which are long enough to project through the slots in the sides of the truss tube and engage internal helical grooves in a casting $c^3$ around the truss tube. Turning the casting or nut $c^3$ forces the studs of the ring $c^2$ along the slots in the truss tube and carries the extension shaft with it. The casting $c^3$ has a lever at one side for turning purposes and to this lever a rod $c^4$ is attached at its rear end while the forward end is attached to the lower end of the pedal $l$.

While the rollers $d$ and $d'$ are capable of being made in several ways and giving good satisfaction, I prefer to make $d$ of separate disks with washers or spacers between. This roller does most of the work and by this construction any soft disk can be replaced with a better one or all of them may be replaced when worn or irregular. (See Fig. 11.) Likewise the ring $k$ is preferably made with the wearing portions set into grooves provided for them. As will be readily understood upon reference to Fig. 11, these rings $k$ are made removable for the purpose of repair or replacement by new ones. They may be held in said grooves in any suitable manner. See section $k$ Fig. 11. The smaller roller $d'$ is used much less in usual driving being used for reversing, starting and occasional emergencies where the driving effort is more than usual so the wear on it is not great. I therefore prefer to make it of one piece. I can fasten these to the extension shaft $c$ in several ways but prefer to fit an ordinary spline or key and provide a nut $c^5$ on the end of the shaft so they can be held tightly or easily removed. In this nut $c^5$ I provide notches $d^2$ for a starting crank so the motor may be turned by hand when desired. I have provided, however, a starting device which can be used from the seat or other preferred position. This I show in detail in Fig. 6. The flywheel $a^3$ has notches in its rim for the pawl $m$ to engage. A steel strap $m'$ is attached to the pawl $m$ and curves around the fly-wheel being held out of contact by its own shape. To its end a cord $m^2$ is attached and this passes through the pulley $m^3$ fixed in the floor of the vehicle in a suitable place to permit the operator to grasp the handle $m^4$ on the end of the cord and turn the fly-wheel by pulling thereon. This device is largely necessary because of the fact that the shafts $c$ are extensible and shiftable fore and aft and because the spokes of the wheel $f$ are often in the way of the application of the usual form of starting crank. The pawl $m$ is maintained in position by an arm $n$ pivoted on the crank case concentric with the crank and the whole device returns to its original position by the retractile effort of the spring $n^2$.

In order to render the mounting and shifting more easy I have used a straight exhaust pipe $o$ and have mounted a short muffler on each end thereof so that these parts move with the power plant but have the fewest joints and parts to be supported. It will also be noticed that I have supported the whole power plant under the top of the side bars forming the reaches of the chassis which leaves the space above the chassis absolutely free for the body except the controlling levers to the rear of the forward axle but they can be placed to the extreme front end of the vehicle and the connection lengthened to suit. This latter arrangement is particularly desirable in delivery wagons where space for the goods is all important.

In Figs. 1 and 7 I show my preferred arrangement of the steering lever mounted on a vertical post with the pivot lengthwise of the vehicle but with the lever not at right angles to the pivot. This throws the handle and outer end of the lever farther forward and permits the driver to get into his seat more easily, a matter of importance in business use where the operator is in and out frequently. This lever is reversible as shown in dotted lines in Fig. 1. The throttle is actuated by twisting the handle and has the actuating rods inside the handle lever and steering post as shown in Fig. 7, the lever being set on a different center line to lengthen the length of the throttle rod crank $p$.

The steering post $r$ may be supported by the bracket $j'$ and move with the chassis or it may be supported on the seat of the body and slide in the brackets so that the spring motion of the body does not change the relative heights of the body and lever. The shifting lever $h$ and the pedal levers are carried by the chassis for they are not in constant use as is the steering and throttle.

On the steering post $r$ in Fig. 5 is fixed an eccentric $s$ which in turn fits in a block $t$. This block $t$ fits between the parallel portions of the forward ends of the subframe $g$ and the subframe $g$ may slide freely lengthwise as the power plant is shifted. The post $r$ and eccentrics $s$ may slide freely up and down under the spring movement of the body if the post $r$ is carried on the body instead of on the chassis. But it is apparent that if the post is turned it will carry the major part of the eccentric to one side and force the block $t$ and front end of the subframe $g$ to the same side. This will result in the driving roller on that side being forced slightly away from its ring $k$ while the opposite roller will be correspondingly tightened. This acts to permit the outer wheel to drive with great positiveness in rounding a corner while the inner roller is practically free to slip and not drive, a most perfect form of balance gear.

That the rings $k$ and $k'$ may be true in a plane vertical and parallel to the length of the vehicle and not thrown out of true by warping or straining of the wheels after a period of use I provide an adjustable bench or bracket shown in Fig. 8. One end of this is clipped to the spoke while the other end has two nuts between which the web of the ring is clamped. These nuts permit quickly truing the ring if the wheel springs or warps so as to throw it out of true. In actual construction there is preferably some looseness in the parts $c'$ $c^2$ and $c^3$ so that the vibrations of the wheels while running do not strain or bind the mechanism. The limit of this looseness is the distance between the grooves or a little less so that in shifting the beveled edges of the roller will enter the proper groove after which the grooves will bring the parts into proper relation. Diagonal struts $u$ are provided so that the chassis will remain square and true and thus maintain the axles in position to insure equal contact of the driving rollers on the rings $k$.

The position of the bracket $j'$ is adjustable on the rod $j$ so as to properly place the forward end of the subframe $g$. The operating rods or wires $i^4$ and $c^4$ are adjustable to allow for wear or to cause the parts on opposite sides to act with equal force and motion.

The placing of the engine cylinders on each side of the fly-wheel makes a symmetric design, carries the weight equally and separates the cylinders so they may be air cooled as easily as if single or practically so since the distance is too great for heat radiated from one to materially affect the other.

I have shown the driving rollers $d$ $d'$ as having their shafts telescopic but if preferred I may shift the rollers on the outer ends of the shafts with of course suitable shifting mechanism.

The fact that the power plant is of unit design and supported under the vehicle frame makes it easily detachable for repairs or for replacement by a duplicate plant, a matter of importance in business vehicles which need not be unloaded to make this change.

What I claim is:—

1. In a motor vehicle, a unit power plant embodying a sectional motor shaft with extensible ends, and a driving element fixed on said shaft.

2. In a motor vehicle, a unit power plant embodying a sectional motor shaft, a driving element fixed near each end thereof, and means for endwise extension of the movable sections of the shaft.

3. In a motor vehicle, a unit power plant, multiple forward driving members fixed upon the shafts of said plant, and coöperating members movable with the vehicle wheels, leaving the space above the frame free and unobstructed, said motor shaft being in sections with the end members extensible.

4. In a motor vehicle, a unit power plant, multiple forward driving members fixed upon the shafts of said plant, and coöperating members movable with the vehicle wheels, said motor shaft being in sections with the end members extensible.

5. In a motor vehicle, a shiftable power plant supported entirely beneath the top of the side bars of the frame, the motor shaft being in sections with the end members extensible, multiple forward driving members fixed to the end members of said shaft, driven members attached to the wheels of the vehicle, and means for shifting the entire power plant to cause the driving and driven members to engage.

6. In a motor vehicle, a shiftable power plant supported entirely beneath the top of the side bars of the frame and provided with multiple forward driving members, the power shaft being in sections with the end members endwise extensible and to which said driving members are fixedly attached, driven members on the wheels of the vehicle, and means for varying the distance between the shaft and axle centers to cause the driven and driving members to engage.

7. In a motor vehicle, a motor having a crank shaft with telescopic extensible ends, various size driving members fixed on the said ends, driven members on the propelling wheels of the vehicle, means for contracting or extending the extensible shaft ends, and means for varying the distance between the shaft and vehicle axle to vary driving pressure.

8. In a motor vehicle, a shiftable power plant provided with multiple forward driving members, the power shaft being in sections with the end members endwise extensible and to which said driving members are fixedly attached, driven members on the wheels of the vehicle, and means for varying the distance between the shaft and axle centers to cause the driven and driving members to engage.

9. In a motor vehicle, a unit power plant supported entirely beneath the tops of the side bars and frame and embodying an endwise extensible motor shaft, driving members on the driving shaft, driven members, means for causing the driving members to engage the driven members on the wheels of the vehicle, and means on the steering post for causing motion of the steering post in steering to vary the amount of the respective engagements of the driving and driven members on opposite sides of the vehicle.

10. In a motor vehicle, a detachable power plant embodying a motor, a motor shaft in sections with the end members thereof endwise extensible, driving members fixed on the extensible ends of said shaft, and means for causing the driving members to engage any driven member on the wheels of the vehicle and to vary driving pressure.

11. In a motor vehicle, a detachable power plant embodying a motor, a motor shaft in sections with the end members thereof endwise extensible, driving members fixed on the extensible ends of said shaft, means for causing the driving members to engage any driven member on the wheels of the vehicle and to vary driving pressure by longitudinal movement of the plant as an entirety.

12. In a motor vehicle, the chassis, the power shaft, a power plant with driving rollers fixed on the ends of the power shaft and driving rings on the propelling wheels for coöperation with the driving rollers, said rings being provided with wearing portions removable for purposes of repair and replacement.

13. In a motor vehicle, the chassis, the power shaft in sections having the end members endwise extensible, a power plant, driving rollers fixed to the end members of said shaft, driving rings on the propeller wheels for coöperation with said rollers, means for engaging a pair of rollers with a pair of rings, and means for laterally adjusting both rings and rollers to the end that they may properly aline with each other.

14. In a motor vehicle, a power plant having a shaft in sections with the end members extensible, driving members fixed to said extensible ends, coöperating driven members on the propelling wheels of the vehicle, and a shifting lever for causing the engagement or disengagement of said driving and driven members, said shifting lever being provided with means for holding it in engaged position or in neutral position.

15. In a motor vehicle, a unit power plant, a steering post and connections with said steering post for varying the contact pressure between the driven and driving members of said plant by movement of said post during the act of steering.

16. In a motor vehicle, a power plant mounted to oscillate laterally, steering mechanism, and means for oscillating said power plant by the operation of the steering mechanism.

17. In a motor vehicle, a frame, a movably mounted power plant, diagonal struts extending substantially across from end to end of the frame and positively fixing or locating the forward point of the power plant.

18. In a motor vehicle, a frame, a unit power plant, a three-point swinging suspension therefor, and diagonal struts for bracing said frame, said struts extending substantially across from end to end of the frame and positively fixing or locating the forward point of the power plant.

Signed by me at Reading Penna. this 15th day of Sept. 1908.

CHARLES E. DURYEA.

Witnesses:
 RHEA E. DURYEA,
 D. M. STEWART.

Copies of this patent may be obtained for five cents each, by addressing the "Commissioner of Patents Washington, D. C."